(12) United States Patent
Kawasaki et al.

(10) Patent No.: US 6,199,919 B1
(45) Date of Patent: Mar. 13, 2001

(54) TUBE CONNECTING STRUCTURE

(75) Inventors: Minoru Kawasaki; Kazuhito Kasahara, both of Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/281,957

(22) Filed: Mar. 31, 1999

(30) Foreign Application Priority Data

Mar. 31, 1998 (JP) ................................................ 10-085324

(51) Int. Cl.$^7$ ................................................ F16L 37/084
(52) U.S. Cl. ........................ 285/319; 285/331; 285/256
(58) Field of Search ........................... 285/319, 331, 285/256

(56) References Cited

U.S. PATENT DOCUMENTS

| | | | |
|---|---|---|---|
| 4,753,459 | * 6/1988 | Potier | 285/331 |
| 4,929,002 | * 5/1990 | Sauer | 285/319 |
| 4,969,667 | * 11/1990 | Sauer | 285/319 |
| 4,969,669 | * 11/1990 | Sauer | 285/319 |
| 4,991,882 | 2/1991 | Gähwiler. | |
| 5,044,675 | * 9/1991 | Sauer | 285/319 |
| 5,078,429 | * 1/1992 | Braut et al. | 285/319 |
| 5,080,404 | * 1/1992 | Sauer | 285/319 |
| 5,161,833 | 11/1992 | McNaughton et al. | |
| 5,882,048 | * 3/1999 | Kawasaki et al. | 285/319 |
| 6,000,729 | * 12/1999 | Williamson et al. | 285/319 |

FOREIGN PATENT DOCUMENTS

| | | | |
|---|---|---|---|
| 181041 | * 2/1955 | (AT) | 285/319 |
| 3935839 | * 5/1990 | (DE) | 285/319 |
| 579141 | * 1/1994 | (EP) | 285/319 |
| 0 840 051 | 5/1998 | (EP). | |
| 2 217 419 | 10/1989 | (GB). | |

* cited by examiner

Primary Examiner—Eric K. Nicholson
(74) Attorney, Agent, or Firm—Oblon, Spivak, McClelland, Maier & Neustadt, P.C.

(57) ABSTRACT

A tube connecting structure for connecting a resin tube and a tubular mating member. The structure includes an engagement member having a cylindrical base that is attached onto the outer peripheral surface of an end portion of the resin tube and is fixed to the resin tube by a cylindrical press-fitted member. The cylindrical press-fitted member is press-fitted into the inner peripheral surface of the end portion, thereby expanding the diameter of the end portion of the resin tube and fixing the cylindrical base to the resin tube. The engagement member has a plurality of arm portions radially extending from the cylindrical base. First engagement portions, in the form of ratchets, are provided to protrude from tip end portions of the arm portions, such that the first engagement portions can be snap-engaged with a second engagement portion on the tubular mating member. The tubular mating member and the resin tube are directly connected to each other with a ring-shaped elastic seal member positioned therebetween.

16 Claims, 8 Drawing Sheets

TUBE CONNECTING STRUCTURE

BACKGROUND OF THE INVENTION

The present invention relates to a tube connecting structure between a resin tube and a tubular mating member. The present invention relates to, in detail, a connecting structure between a resin tube, such as an automotive tube such as, for example, a fuel tube, and a tubular mating member such as a metal pipe.

A rubber tube has been conventionally used as an automotive fuel tube or the like. In recent years, however, the rubber tube tends to be replaced by a resin tube made of hard resin, such as nylon, having good gasoline permeability resistance or the like due to its lower cost. The same thing occurs to other automotive dedicated tubes such as an air tube.

Conventionally, as disclosed in, for example, U.S. Pat. No. 5,161,833 and U.S. Pat. No. 4,991,882, in case of fluid-tight connecting a resin tube of this type to a mating member, the following connecting structure is known. A containing portion is formed such that a retaining member is retained on axial one end of an axis bore of the cylindrical housing and a ring-shaped elastic seal member, such as an O ring, is retained axially inward of this retaining member. When the insertion end portion of a tubular mating member is inserted into the interior of the retaining member from one end of the housing thereof, the retaining member is snap-engaged with an annular stopper on the insertion end portion to thereby fluid-tight connect the mating member to the one end portion of the housing. At the same time, an engaged one end portion having an outer peripheral surface smaller in diameter than the one end portion is formed integrally with the other end of the housing. The inner peripheral surface of the one end portion of the resin tube is press-fitted into the engaged end portion and the resin tube is fluid-tight connected to the other end portion of the housing. The housing having the retaining member retained on one end portion and the tubular mating member inserted into the one end portion of the housing form a quick connector as a whole. Normally, a tube connecting structure using the quick connector is widely used.

The above-stated quick connector is complex in structure and expensive. Due to this, there has been proposed a method of directly connecting a resin tube to a tubular mating member not using the quick connector but using a simple member. This is disclosed in, for example, the published specification of EP0840051. Specifically, it discloses a hose connecting structure in which the first engagement portion of a tubular mating member is formed integrally with the end portion, which is blow-molded, of a resin tube, an elastic seal member such as an O ring is installed into an annular groove, which is also blow-molded, and the second engagement portion of the tubular mating member is engaged with the first engagement portion of the resin tube, thereby connecting the resin tube with the tubular mating member.

In the tube connecting structure connecting a resin tube with a tubular mating member using the conventional quick connector, the engaged end portion of a cylindrical housing is press-fitted into the inner peripheral surface of one end of the resin tube. The problem with this structure is that the connecting portion is lacking in the reliability in terms of pulling resistance and sealing property. And the tube connecting structure using the conventional quick connector is complicated in structure and requires a number of parts. As a result, the structure becomes expensive. It also requires two liquid-tight seal connecting portions axially separated from each other, with the result that the tube connecting structure becomes longer in axial direction. In these circumstances, demand for a tube connecting structure which is more compact, requires lower cost and ensures that a resin tube is liquid-tight connected to a tubular mating member is rising.

By the way, the tube connecting structure proposed in the published specification of EP0840051 as stated above does not employ a conventional quick connector mentioned above. Thus, it is relatively simple in structure and has an excellent is sealing property. This is because the resin tube is directly connected to the tubular mating member by putting an elastic seal member between the resin tube and the tubular mating member.

However, due to the fact that the first engagement portion is formed integrally with the end portion of the resin tube so as to engage the resin tube with the tubular mating member, the structure of EP0840051 requires bothersome blow molding. That is, it requires setting a resin tube into a blow molding die and then blow molding or injection molding the first engagement portion, or setting the first engagement portion, which has been molded independently in advance, into a blow molding die and then extruding parison into the blow molding die to thereby blow-molding the first engagement portion. Thus, the structure is disadvantageous in that it has poor productivity and that the merit of low cost is thereby lost.

BRIEF SUMMARY OF THE INVENTION

The present invention has been made in these circumstances. It is, therefore, an object of the present invention to provide a tube connecting structure which does not use a conventional quick connector press-fitting and thereby connecting the inner peripheral surface of the end portion of the end portion of a resin tube into an engagement end portion formed on the other end of a housing, which does not require blow-molding for integrally forming the first engagement portion with the resin tube, which can directly connect the resin tube to a tubular mating member while putting an elastic seal member therebetween, which is, therefore, excellent in the reliability in terms of sealing property, simple and compact in structure and which can be provided at extremely low cost.

To attain the above object, a tube connecting structure provided by the present invention is characterized by comprising a resin tube having at least one end portion extending straight; a ring-shaped elastic seal member inserted into and attached onto an outer peripheral surface or inner peripheral surface of the one end portion of the resin tube; an engagement member including a cylindrical base fitted into the outer peripheral surface of the one end portion of the resin tube and a first engagement portion formed integrally with the cylindrical base; a cylindrical press-fitted member having a cylindrical body, the body press-fitted into the inner peripheral surface of the end portion of the resin tube, expanding a diameter of the end portion and fixing the engagement member to the resin tube; and a tubular mating member having an insertion end portion, the insertion end portion provided with a second engagement portion, the second engagement portion engaged with the first engagement portion of the engagement member, and in that the ring-shaped seal member is disposed a radial annular groove defined by one end portion of the cylindrical press-fitted member onto the outer peripheral surface or the inner peripheral surface of the one end portion of the resin tubes, when the insertion end portion of the tubular mating member is inserted into the outer peripheral surface or inner peripheral surface of the end portion of the resin tube, the second engagement portion engaged with the first engagement portion of the engagement member; thereby sealing the insertion end portion of the tubular mating member and the one end portion of the resin tube.

As one mode of the tube connecting structure according to the present invention, the tube connecting structure is characterized by comprising a cap-shaped outer cylindrical portion returned outward of the cylindrical body to cover an end face of the resin tube and the outer peripheral surface of the on one end portion of the resin tube at an one end of the cylindrical press-fitted member, the ring-shaped elastic seal member is axially retained on the outer peripheral surface of the resin tube between the cap-shaped outer cylindrical portion of the cylindrical body of the cylindrical press-fitted member and the cylindrical base of the engagement member, and in that when the insertion end portion of the tubular mating member is inserted into the outer peripheral surface side of the end portion of the resin tube, the inner peripheral surface of the insertion end portion is engaged with the outer peripheral surface of the cylindrical base and with the outer peripheral surface of the cap-shaped outer cylindrical portion.

In another mode of the tube connecting structure according to the present invention, the tube connecting structure is characterized by comprising the cap-shaped inner cylindrical portion returned inner ward of the cylindrical body to cover an end face of the resin tube and the inner peripheral surface of the one end portion of the resin tube at an one end of the cylindrical base of the engagement member, the ring-shaped elastic seal member is axially retained on the inner peripheral surface of the resin tube between the cap-shaped inner cylindrical portion of the engagement member and the body of the cylindrical press-fitted member, and in that when the insertion end portion of the tubular mating member is inserted into the inner peripheral surface side of the end portion of the resin tube, the outer peripheral surface of the insertion end portion is engaged with both of the inner peripheral surface of the cylindrical body of the cylindrical press-fitted member and the inner peripheral surface of the cap-shaped inner cylindrical portion.

Furthermore, the tube connecting structure according to the present invention can comprise a retaining member fitted into the inner peripheral surface of the end portion of the resin tube instead of the cap-shaped inner cylindrical portion, and the ring-shaped elastic seal member is axially retained on the inner peripheral surface of the resin tube between the retaining member and the cylindrical body of the cylindrical press-fitted member.

In a preferred embodiment according to the present invention, the tube connecting structure is characterized in that the engagement member integrally comprises a plurality of arm portions axially extending from the cylindrical base toward the end surface of the one end portion of the resin tube, and the arm portions defined a radial space between the arm portions and the outer peripheral surface of both of the outer peripheral surface of the cylindrical base and the cap-shaped outer cylindrical portion and the cylindrical base, the arm portions circumferentially spaced from one another; and ratcheted first engagement portions provided to protrude radially inwardly on tip end portions of the arm portions, respectively, and in that the annular first engagement portions are snap-engaged with the second engagement portion of the tubular mating member inserted into a radial space of the plural arm portions.

In another preferred embodiment according to the present invention, the tube connecting structure is characterized in that the resin engagement member integrally comprises two arm portions axially extending from the cylindrical base toward axial one end direction, the two arm portions opposite to each other and circumferentially spaced from one another furthermore the two arm portions radially spaced from the cylindrical base each other; a circular ring portion integrally connected with a tip end portion of the two arm portions and provided coaxially with the cylindrical base; and a pair of ratcheted first engagement portions provided, opposite to each other, to protrude radially inwardly on an inner peripheral surface of the ring portion, and in that the first engagement portions are snap-engaged with the second engagement portion of the tubular mating member inserted into interiors of the ring portion.

In yet another embodiment according to the present invention, the above-stated tube connecting structure is characterized in that the engagement member integrally comprises two arm portions axially extending from the cylindrical base toward an axial one end direction, the two arm portions opposite to each other and circumferentially spaced from one another furthermore the two arm portions radially spaced from the cylindrical base each other; an elliptical or oval ring portion integrally connected with a tip end portion of the two arm portions and provided coaxially with the cylindrical base; and a pair of ratcheted first engagement portions provided, opposite to each other, to protrude radially inwardly on an axially inner peripheral surface of the ring portion on which the ring has a smallest inner diameter, and in that the first engagement portions are snap-engaged with the second engagement portion of the tubular mating member inserted into interiors of ring portion.

According to the present invention, the resin tube and the tubular mating member can be directly connected to each other while putting a ring-shaped elastic seal member therebetween by using an engagement member fixedly inserted into the outer peripheral surface of the end portion of the resin tube, and a tube connecting structure excellent in sealing property can be thereby provided. The tube connecting structure according to the present invention does not use a conventional connector having a complicated structure in which an insertion portion is press-fitted into the inner peripheral surface of the end portion of the resin tube to thereby connect the resin tube with a tubular mating member, and does not require blow-molding and a molding die for integrally forming the first engagement portion with the resin tube. The connecting structure according to the present invention is, therefore, simple in structure, excellent in productivity and can be provided at extremely low cost.

DESCRIPTION OF THE PREFERRED EMBODIMENTS

According to the present invention, a cylindrical base of a resin engagement member formed into one piece is fitted into the outer peripheral surface of the end portion of a resin tube. Thereafter, a cylindrical press-fitted member is press-fitted into the inner peripheral surface of the end portion of the resin tube, thereby slightly expanding the diameter of the end portion of the resin tube. The cylindrical base of the engagement member is, thus, fixed to the outer peripheral surface of the end portion of a wider diameter without positional displacement. According to the present invention, therefore, it is not required to blow-mold the end portion of the resin tube so as to fix the engagement member or the like as in the tube connecting structure described in the published specification of EP0840051 stated above. Thus, a longer resin tube having an engagement member extrusion-molded to engage with a tubular mating member can be easily fixedly attached into any shorter resin tube of a single layer or multiple layers having straight-cut end portions of predetermined lengths, which attachment is quite cost effective.

Moreover as mentioned above, the engagement member fixed to the outer peripheral surface of the end portion of the resin tube can be easily and directly connected to the tubular mating member without using other members, by engaging the first engagement portion of the engagement member with the second engagement portion of the tubular mating member. It is noted that the shape of the first engagement portion of the engagement member and that of the second engagement portion of the tubular mating member are not limited to any specific shapes. They may be freely chosen so that the engagement member is surely connected to the tubular mating member without separation. Since a ring-shaped elastic seal member, such as an O ring, is put between the resin tube and the tubular mating member both of which have been thus directly connected to each other, excellent sealing property can be exhibited. In addition, the cylindrical press-fitted member press-fitted into the inner peripheral surface of the end portion of the resin tube allows the dimensional accuracy of the end portion of the resin tube to enhance to thereby further improve sealing property and to reinforce the end portion of the resin tube which tends to be damaged or deformed by external stress.

Various types of tubes which have been conventionally and normally available automotive tubes and the like can be used as resin tubes. Any straight or curved tubes may be used as long as the end portions thereof are straight. Although the material of the resin tube is not specifically limited, nylon or fluoroplastic material may be preferable for a fuel tube. The tube may be normally mono-layered or multiple-layered made of different types of resin. Also, to add conductivity, a multiple-layered tube having, for example, a conductive ETFE layer, a conductive nylon layer or the like included as an inner layer may be used. The resin tube such as, for example, a fuel tube, is normally about 4 to 18 mm in inner diameter and about 0.5 to 2 mm in thickness.

The engagement member formed into one piece and the cylindrical press-fitted member in the present invention may be made of hard resin or metal. Preferably, they are made of resin such as polyacetal resin and nylon resin in light of production cost. A conventional member such as an O ring can be used as a ring-shaped seal member. A metal or resin pipe to which a resin tube is connected, such as a pipe attached to various equipment such as, for example, an automotive engine may serve as a tubular mating member.

Figure 1:
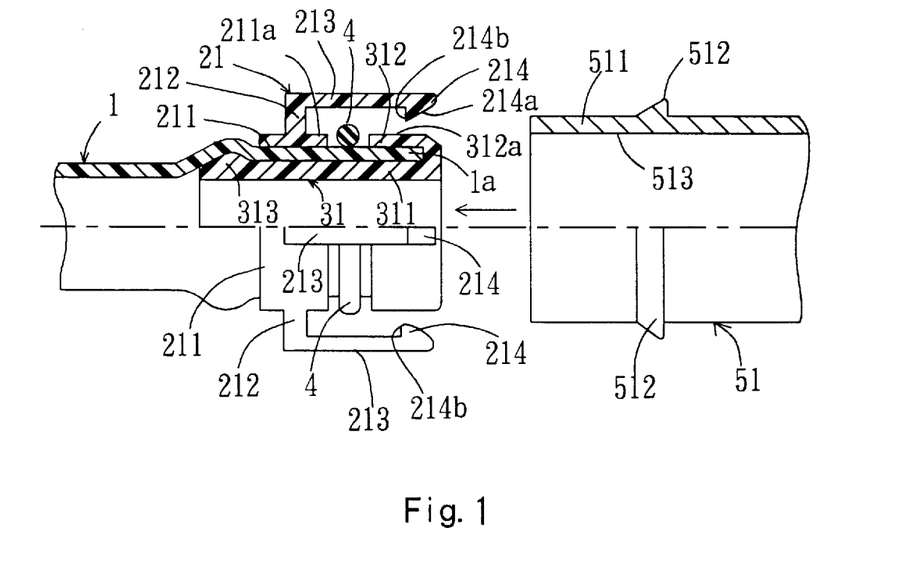
FIG. 1 shows an example of a tube connecting structure according to the present invention and schematically shows a partially cut side view in a state in which a resin tube is not yet connected to a tubular mating member.

The tube connecting structure according to the present invention will now be specifically described with reference to the accompanying drawings. A preferred example of a tube connecting structure is shown in FIG. 1. The tube connecting structure shown therein basically consists of a resin tube 1 having a straight end portion on one axial end, a resin engagement member 21 including a cylindrical base 211 inserted into and attached onto the outer peripheral surface of the end portion 1a of the tube 1 and a ratcheted first engagement portion 214 integrally formed with the base 211, a cylindrical press-fitted member 31 press-fitted into the inner peripheral surface of the end portion 1a of the resin tube 1, a ring-shaped elastic seal member 4 inserted into one end side of the resin tube 1 from the cylindrical base 211 on the outer peripheral surface thereof, and a cylindrical mating member 51 which has an integrally formed second engagement portion 512 engaged with the first engagement portion 214 of the engagement member 21. The cylindrical base 211 of the engagement member 21 is fixed to the outer peripheral surface of the resin tube 1 since the diameter of the tube 1 is expanded by the cylindrical body 311 of the press-fitted member 31 which is press-fitted into the inner peripheral surface of the resin tube 1.

The above engagement member 21 will be described in more detail. As shown in FIG. 1, the engagement member 21 is provided with a plurality of supports 212 which circumferentially rise from the outer peripheral surface 211a of the cylindrical base 211 radially outward in a columnar manner and are spaced from one another. Arm portions 213 axially extending from the upper ends of the supports 212 toward one end direction axially are integrally formed with the cylindrical base 211, and are radially spaced from the outer peripheral surface 211a of the cylindrical base 211 respectively. A ratcheted first engagement portion 214 having a stopper surface 214b radially protruding and extending in the direction perpendicular to the axial direction is formed on one side end portion of each arm portion 213. The first engagement portions 214 protruding from the end portions of the respective arm portions 213 are snap-engaged with the second engagement portion 512 annually protruding on the outer peripheral surface of the insertion end portion 511 of the tubular mating member 51 when the tubular mating member 51 is inserted into the plural arm portions 213.

That is to say, the ratcheted protruding first engagement portions 214 has an insertion side one end of a greater diameter so as to easily insert the insertion end portion 511 of the tubular mating member 51 into the engagement member 21. The inner peripheral surface of each of the first engagement portions 214 forms an inclined surface 214a having a diameter gradually reduced toward the other end thereof. A stopper surface 214b is formed on the surface opposite to the inclined surface 214a in the direction perpendicular to the axis axial direction. Thus, if the tubular mating member 51 is inserted into the interiors of the plural arm portions 213 of the engagement member 21, the second engagement portion 512 of the annular mating member 51 progresses along the inclined surfaces 214a of the first engagement portions 214 while the arm portions 213 are being elastically deformed outward in radial direction, as will be described later. The second engagement portion 512 is snap-engaged with the stopper surfaces 214b after the arm portions 213 return to original shapes, respectively.

Next, the assembly of the tube connecting structure will be described with reference to FIG. 1 and FIG. 2. First, as shown in FIG. 1, the cylindrical base 211 of the engagement member 21 and the ring-shaped elastic seal member 4 are inserted into the outer peripheral surface of the end portion of the resin tube 1. The cylindrical body 311 of the press-fitted member 31 is then press-fitted into the inner peripheral surface of the tube 1 from the end portion 1a of the tube 1. By press-fitting the cylindrical body 311 of the press-fitted member 31 into the inner peripheral surface thereof, the diameter of the resin tube 1 is expanded radially outward. Due to this, the cylindrical base 211 of the engagement member 21 inserted into and attached onto the outer peripheral surface of the end portion of the resin tube 1 is pushed by the outer peripheral surface of the tube 1 having a expanded diameter and is fixed thereto. Further, a nipple 313, smoothly protruding radially outward, is provided at the insertion side tip end portion of the cylindrical press-fitted member 31. Thus, if the nipple 313 is moved beyond the cylindrical base 211 of the engagement member 21 and press-fitted into the other end side of the tube 1, the resin tube 1 is firmly put between the press-fitted member 31 and the cylindrical base 211 to thereby prevent the positional displacement among the press-fitted member 31, the resin tube end portion 1a and the base 211 of the engagement member 21 relative to one another.

A cap-shaped outer cylinder portion 312 is returned outwardly of the cylindrical body 311 to cover an end face of the resin tube 1 and outer peripheral surface of one end portion of the resin tube 1 from one end of the cylindrical body 311 of the press-fitted member 31 is provided the cylindrical press-fitted member 31 press-fitted into the inner peripheral surface of the end portion of the resin tube 1. Therefore, if the cylindrical body 311 of the press-fitted member 31 is press-fitted as stated above, the end portion 1a of the resin tube 1 is fitted and inserted into a groove formed between the cap-shaped outer cylindrical portion 312 and the cylindrical body 311 to thereby cover the end face of the resin tube 1, so that the end face is prevented from being exposed to fluid. Besides, the cap-shaped outer cylindrical portion 312 reaches onto the outer peripheral surface of the end portion of the resin tube 1, it is ensured that the ring-shaped elastic seal member 4 is retained an annular groove between the cap-shaped outer cylindrical portion 312 and the cylindrical base 211 of the engagement member 21.

In this embodiment, the cap-shaped outer cylindrical portion 312 is formed on one end portion of the cylindrical press-fitted member 3. The cylindrical press-fitted member 3 may be a straight tube and a separately formed ring-shaped retaining member may be fitted into the outer peripheral surface of the one end of the resin tube 1, whereby the ring-shaped elastic seal member 4 can be retained between the retaining member and the cylindrical base 211 of the engagement member 21.

Figure 2:
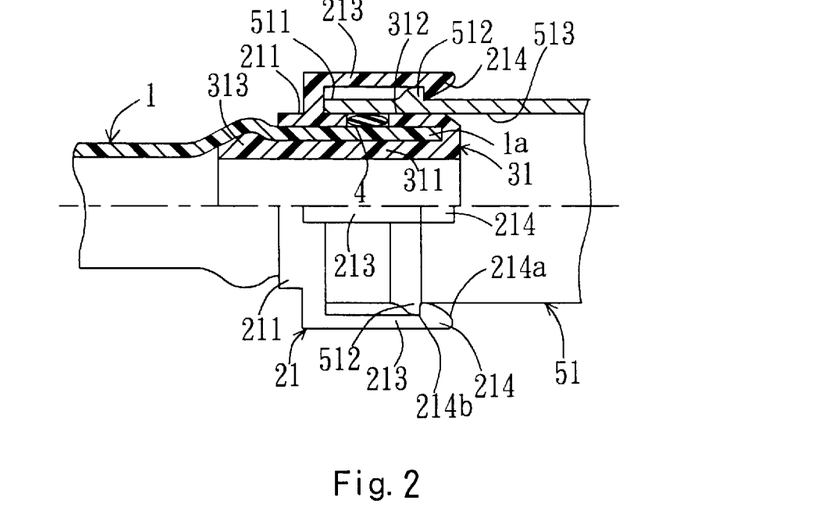
FIG. 2 shows an example of the tube connecting structure according to the present invention and schematically shows a partially-cut side view in a state in which the resin tube has been connected to the tubular mating member.

Thereafter, as shown in FIG. 2, the end portion 1a of the resin tube 1, whose outer peripheral surface the engagement member 21 is fixed to, is inserted into and connected to the tubular mating member 51. The insertion end portion 511 of the tubular mating member 51 is inserted into the radial space of the plural arm portions 213 of the engagement member 21. Also, the inner peripheral surface 513 of the insertion end portion 511 of the tubular mating member 51 is engaged with the outer peripheral surface 211a of the cylindrical base 211 of the engagement member 21 and with the outer peripheral surface 312a of the cap-shaped outer cylindrical member 312 of the cylindrical press-fitted member 31. At this time, the annular second engagement projection 512 protruding radially outward of the outer periphery of the insertion end portions 511 of the tubular mating member 51 progresses along the inclined surfaces 214a of the ratcheted first engagement portions 214 while the arm portions 213 are being elastically deformed outward in radial direction. When the second engagement portion 512 passes through the inclined surfaces 214a, the arm portions 213 elastically deformed outward in radial direction return to their original shapes and the second engagement portions 512 are engaged with the stopper surfaces 214b of the first engagement portions 214, respectively, thereby connecting the tubular mating member 51 with the resin tube 1.

In this state, the inner peripheral surface 513 of the tubular mating member 51 is retained by the outer peripheral surfaces 211a and 312a of the cylindrical base 211 of the engagement member 21 and the cap-shaped outer cylindrical portion 312b of the cylindrical press-fitted member 31, with the surface 513 slid onto or closely adjacent to the surfaces 211a and 312a. At the same time, the ring-shaped elastic seal member 4 is put between the outer peripheral surface of the resin tube 1 and the inner peripheral surface 513 of the tubular mating member 51.

In the conventional tube connecting structure using a quick connector, by contrast, the resin tube is connected to the engagement portion formed on the other end of the housing irrespectively of the connecting portion of the mating member, therefore, the length of the tube connecting structure becomes long. Accordingly, compared with the conventional tube connecting structure, the tube connecting structure according to the present invention is more compact and has greatly improved reliability on sealing property.

Figure 3:
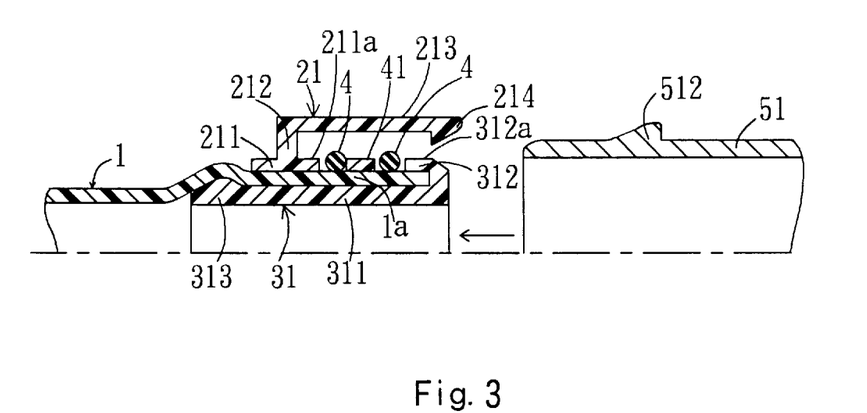
FIG. 3 is another example of the tube connecting structure according to the present invention and is a schematically cross-sectional view showing a state in which a resin tube is not yet connected to a tubular mating member, while the lower half of th view is being omitted.

Now, several other examples of the tube connecting structures according to the present invention will be described. The example of a tube connecting structure shown in FIG. 3 has the same structure as that shown in FIG. 1 and FIG. 2 except that a plurality of ring-shaped elastic seal members 4 are inserted into and attached onto the outer peripheral surface of the end portion of the resin tube 1. In this example, it is preferable that the annular member 41 is inserted between the ring-shaped elastic seal members 4 since the members 4 provided between the cylindrical base 211 of the engagement member 21 and the cap-shaped outer cylindrical portion 312 of the cylindrical press-fitted member 31 are spaced from and positioned with respect to one another. The annular member 41 has the same inner diameter as that of the cylindrical base 211 of the engagement member 21 and is fixed to the outer peripheral surface of the resin tube 1 which diameter is expanded by the cylindrical press-fitted member 31.

Figure 4:
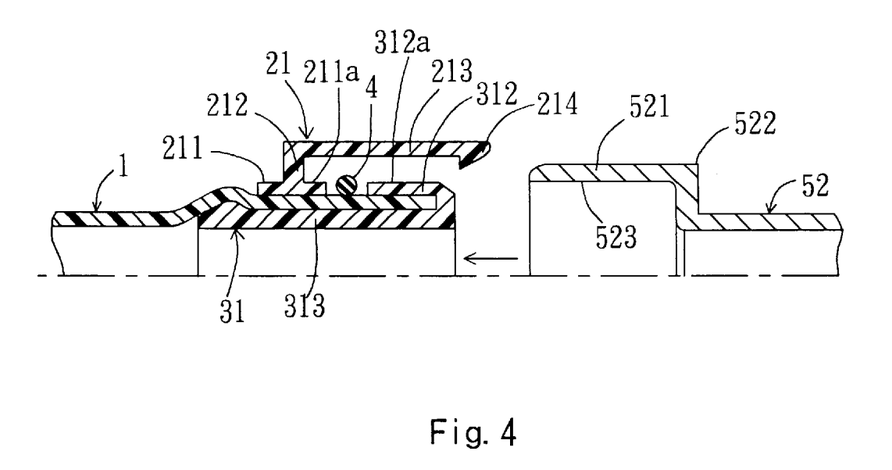
FIG. 4 is yet another example of the tube connecting structure according to the present invention and is a schematically cross-sectional view showing a state in which a resin tube is not yet connected to a tubular mating member, while the lower half of the view is being omitted.

Furthermore, the engagement member 21 and the cylindrical press-fitted member 31 of a tube connecting structure shown in FIG. 4 are the same as those shown in FIG. 1 and FIG. 2. However, the tubular mating member 52 and the second engagement portion 522 have different structures. That is, while the inner diameter of the tubular mating member 52 other than that of the insertion end portion 521 is almost the same as the inner diameter of the resin tube 1 and that of the cylindrical press-fitted member 31, the inner diameter of the insertion end portion 521 is made larger than that of the resin tube 1. Thus, as in the case of FIG. 1 and FIG. 2, the insertion end portion 521 can be inserted between the respective arm portions 213 of the engagement member 21 and the cap-shaped outer cylindrical portions 312 of the cylindrical press-fitted member 31. The shoulder portion 522 of the insertion end portion 521 having a expanded diameter acts as the second engagement portion to be engaged with the first engagement portions 214 of the engagement member 21. In addition, the insertion end portion 521 side-shoulder portion 522 abuts on the cap-shaped outer cylindrical portion 312 of the cylindrical press-fitted member 31, thereby acting as a stopper to prevent excessive insertion of the tubular mating member 52.

Figure 5:
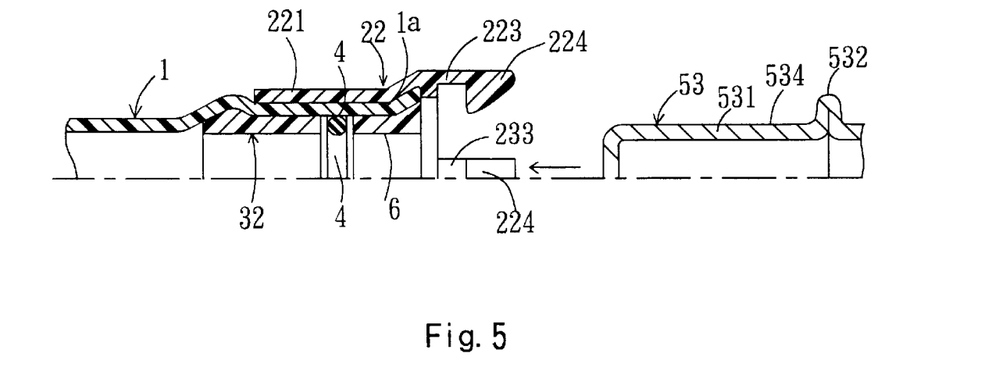
FIG. 5 is yet another example of the tube connecting structure according to the present invention and is a schematically cross-sectional view showing a state in which a resin tube is not yet connected to a tubular mating member, while the lower half of the view is being omitted.
Figure 6:
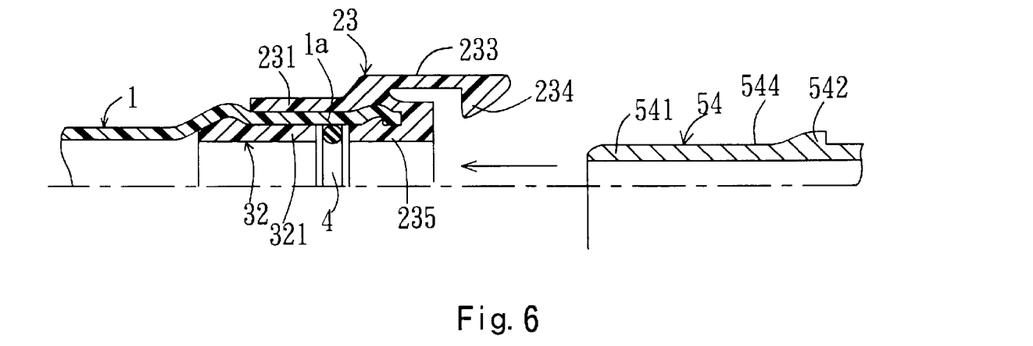
FIG. 6 is yet another example of the tube connecting structure according to the present invention and is a schematically cross-sectional view showing a state in which a resin tube is not yet connected to a tubular mating member, while the lower half of the view is being omitted.

In examples of tube connecting structures shown in FIG. 5 and FIG. 6, the ring-shaped elastic seal member 4 is inserted into and attached onto the inner peripheral surface of the end portion of the resin tube 1. In these examples, when the insertion end portion 531, 541 of the tubular mating member 53, 54 is inserted to thereby engage the tubular mating member with the engagement member 21, the ring-shaped elastic seal member 4 is put between the outer peripheral surface 534, 544 of the insertion end portion 531, 541 of the tubular mating member 53, 54 and the inner peripheral surface of the end portion of the resin tube 1 and the outer peripheral surface 534, 544 of the insertion end portion 531, 541 and the inner surface of the end portion of the resin tube 1 are fluid-tight sealed. Thus, it is necessary that the ring-shaped elastic seal member 4 is arranged to contact with the inner peripheral surface of the end portion of the resin tube 1.

Due to this, in the example of FIG. 5, the shorter cylindrical press-fitted member 32 is first press-fitted deep into the inner peripheral surface of the end portion 1a of the resin tube 1, the ring-shaped elastic member 4 is inserted and furthermore the cylindrical retaining member 6 is press-fitted. In the example of FIG. 6, the engagement member 23 wherein one end portion of the engagement member 23 inserted into and attached onto the outer peripheral surface of the end portion 1a of the resin tube 1, integral with the cap-shaped inner cylindrical portion 235 bent to have a generally U-shaped cross-section to cover the end face of the resin tube 1, is injection-molded by resin material, is used. That is, the shorter cylindrical press-fitted member 32 is press-fitted deep into the inner surface of the end portion of the resin tube 1, and the ring-shaped elastic seal member 4 is inserted an annular groove defined the cylindrical body 321 and the engagement member 23 is finally press-fitted into the outer peripheral surface of the end portion of the resin tube 1, thereby the ring-shaped elastic seal member 4 is retained the annular groove between the cap-shaped inner cylindrical portion 235 and the cylindrical body 321 of the press-fitted member 32.

The tube connecting structures shown in FIG. 5 and FIG. 6 differ in the shape of the engagement member 22, 23 from those shown in FIGS. 1 through 4 since the tubular mating member 53, 54 is inserted into the inner peripheral surface side of the end portion of the resin tube 1. In other words, although each of the engagement members 22, 23 shown in FIG. 5 and FIG. 6 is inserted into and fixed onto the outer peripheral surface of the end portion of the resin tube 1 by the cylindrical base 221, 231, there is no need to provide a support rising from the cylindrical base 221, 231 for forming a clearance into which the tubular mating member 53, 54 is inserted. Owing to this, a plurality of arm portions 223, 233 are formed to directly extend from the cylindrical base 221, 231 toward the one end direction axially and ratcheted first engagement portions 224, 234 are provided on the tip end portions of the arm portions 223, 233 respectively and ratcheted first engagement portions 224, 234 are engaged with the annular second engagement portion 532, 542 of the tubular mating member 53, 54. It is noted that the annular second engagement protrusion 532 of the tubular mating member 53 shown in FIG. 5 is formed by bead-processing a metal pipe.

Figure 7:
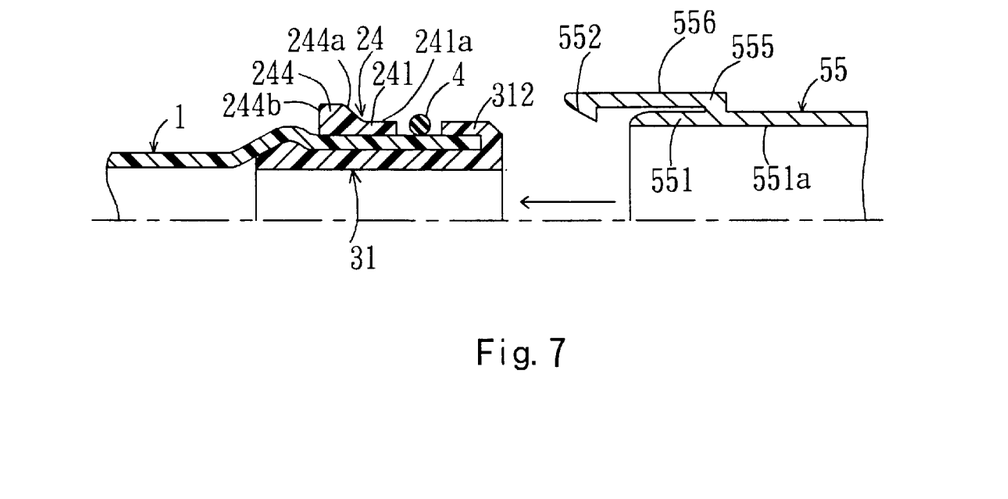
FIG. 7 is yet another example of the tube connecting structure according to the present invention and is a schematically cross-sectional view showing a state in which a resin tube is not yet connected to a tubular mating member, while the lower half of the view is being omitted.

Further in the tube connecting structure shown in FIG. 7, the shape of the first engagement portion of the resin engagement member and that of the second engagement portion of the tubular mating member are opposite to those in the above respective examples. That is, a plurality of supports 555 spaced from one another are provided on the outer peripheral surface of the insertion end portion 551 of the tubular mating member 54. A plurality of arm portions 556 are formed to extend from the upper ends of the supports 555 toward the other end axially, respectively and ratcheted second engagement portions 552 are provided to protrude from the tip end portions of the arms 556 radially inward, respectively. Meanwhile, the engagement member 24 is basically straight cylindrical and has a cylindrical base 241 having an outer peripheral surface 241a engaged with the inner peripheral surface 551a on the insertion end portion 551 of the tubular mating member 55 provided on one end thereof and the first engagement portion 244 annually protruding outward in radial direction on the other end thereof. The first engagement portion 244 has an wave-shaped inclined surface 244a on one end thereof and a stopper surface 244b provided perpendicularly to the axial direction on the other end thereof. Thus, when connecting the tubular mating member 55 to the resin tube 1, the second engagement portion 522 of the tubular mating member 55 progresses along the inclined surface 244a of the first engagement portion 244 while being elastically deformed and the diameter thereof is being expanded. When returning to its original shape, the second engagement portion 552 abuts on the stopper surface 244b, thereby snap-engaging the tubular mating member 55 with the engagement member 24.

The engagement member fitted into and attached onto the outer peripheral surface of the end portion of the resin tube can be fixed onto the outer peripheral surface of the end portion of the resin tube without positional displacement. This is because the diameter of the resin tube is expanded by the cylindrical press-fitted member press-fitted into the inner peripheral surface of the end portion of the resin tube as stated above. If high internal pressure is applied to the resin tube, etc., the engagement member is desirably fixed onto the outer peripheral surface of the end portion of the resin tube more surely and firmly.

Figure 8:
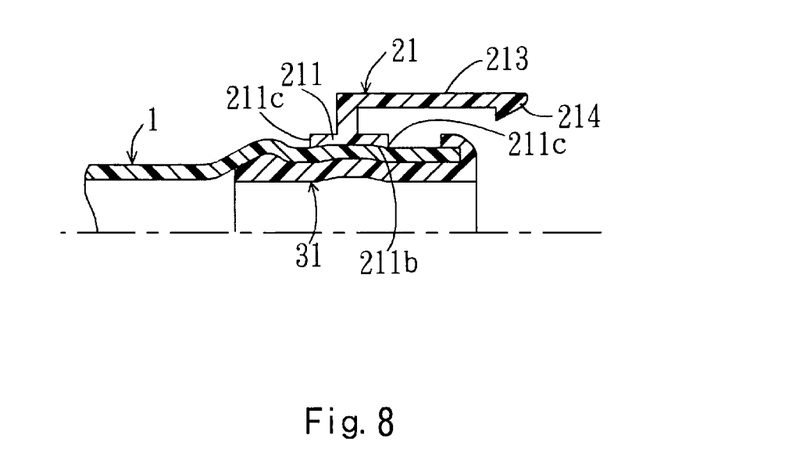
FIG. 8 is a schematically cross-sectional view showing an example of means for preventing the positional displacement of the engagement member fitted into the resin tube in the tube connecting structure according to the present invention, while the lower half of the view is being omitted.

As a means for preventing the positional displacement of the resin engagement member, there are provided, for example, annular projecting portions 211c annularly protruding inward in radial direction on both edge portions of the cylindrical base 211 of an improved engagement member 21 described in FIG. 4 as shown in FIG. 8. The annular projecting portions 211c can be bit into the outer peripheral surface of the resin tube 1. Further, a cylindrical press-fitted member 31 is formed out of metal and press-fitted into the inner peripheral surface of the resin tube 1 and the diameter of the cylindrical press-fitted member 31 is expanded mechanically from inner peripheral surface side. Thus, it is possible to bite the outer peripheral surface of the resin tube 1 into the annular projecting portions 211c provided at the cylindrical base 211 of the engagement member 21 more strongly.

Figure 9:
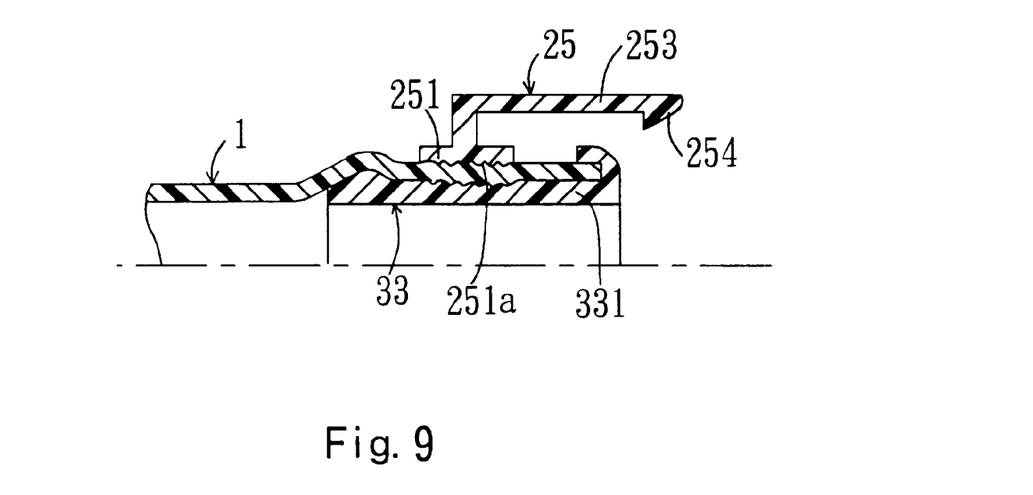
FIG. 9 is a schematically cross-sectional view showing another example of means for preventing the positional displacement of the engagement member fitted into the resin tube in the tube connecting structure according to the present invention, while the lower half of the view is being omitted.

In addition, as shown in FIG. 9, a plurality of irregular portions 251a such as saw-tooth and volute portions, which are well-known as a normal positional displacement preventing mechanism, may be provided on the inner peripheral surface of the cylindrical base 251 of the engagement member 25 which is inserted into and attached onto the outer peripheral surface of the end portion of the resin tube 1. The irregular portions 251a are bit into the outer peripheral surface of the resin tube 1, thereby allowing the engagement member 25 to be firmly fixed to the outer peripheral surface of the end portion of the resin tube 1. The irregular portions 251a may be not only provided on the cylindrical base 251 of the engagement member 25 but also on the outer peripheral surface of the cylindrical press-fitted member 33 press-fitted into the inner peripheral surface of the end portion of the resin tube 1 as shown in FIG. 9.

Figure 10:
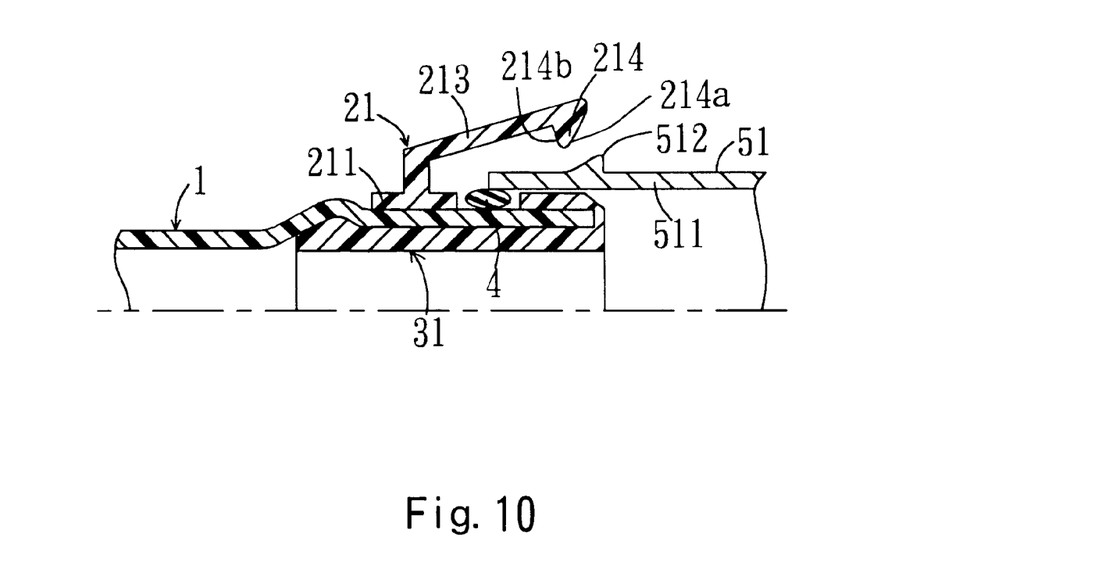
FIG. 10 is a schematically cross-sectional view showing a state in which the resin tube and the tubular mating member connected to each other are released from each other, while the lower half of the view is being omitted.

In the tube connecting structure according to the present invention, if the engagement member fixed to the resin tube is separated from the tubular mating member, the diameters of the plural arms 213 extending in the axial direction of the engagement member 21 are expanded radially outward as shown in, for example, FIG. 10 in the tube connecting structure shown in FIG. 2. The first engagement portions 214 on the tip end portions of the arm portions 213 then need to be released from the second engagement portion 512 of the tubular mating member 51 to disengage the resin tube 1 from the tubular mating member 51. Thus, to raise the respective arm portions 213 radially outward, normally the tubular mating member 51 and the resin tube 1 are pulled relative to each other while the first engagement portions 214 are being disengaged from the second engagement portion 512 pressing a tip of a cylindrical release tool (not shown) to the inclined surface 214a, the release tool inserted into the back portion of the annular second engagement protrusion 512 of the tubular mating member 51. As a result, the tubular mating member 51 can be released from the engagement member 21 fixed to the resin tube 1.

Figure 11:
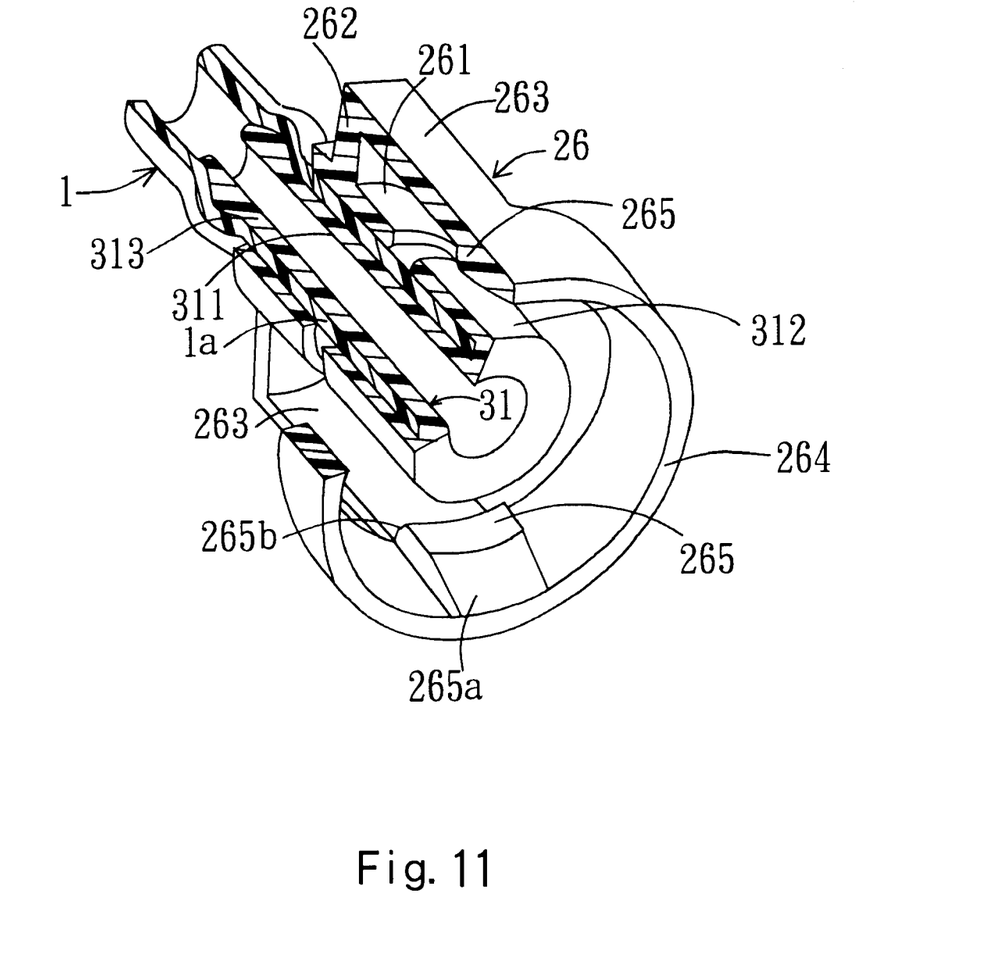
FIG. 11 is an example of describing the tube connecting structure according to the present invention and is a partially-cut perspective view showing a state in which the engagement member having a ring portion is fixedly inserted into the end portion of the resin tube.

The structure shown in FIG. 11, for example, is a preferred embodiment of the engagement member according to the present invention. That is, the tubular mating member is basically the same as that shown in FIG. 1. In this engagement member 26, however, a plurality of columnar supports 262 rising radially outwardly from the outer peripheral surface of the cylindrical base 261 are provided integrally with the base 261 while the supports 262 are circumferentially spaced apart from one another. Two arms 263 radialy extending from the upper end portions of the supports 262 toward the axial one end side thereof are also formed integrally, respectively, to thereby allow the insertion end portion 511 of the tubular mating member 51 to be inserted into the tip end portions of the arms 263. Also, a circular ring 264 which can be elliptically deformed when the tubular mating member is connected to or disconnected from the resin tube 1, is provided on the tip end portions of the arms 263 coaxially and integrally with the cylindrical base 261 and a circular ring portion 264 integrally connected with a tip end portion of said arm portions 263, and said arm portions 263 defined a radial space between the arm portions 263 and both of the peripheral surface of the cylindrical base 261 and a cup-shaped outer cylindrical portion 312. A pair of ratcheted first engagement portions 265, 265 protruding radially inward are formed integrally with the ring 264 at two opposing positions on the inner peripheral surface of the ring 264, or preferably at two opposing positions on the extending line of the arm 263 or on the extension shifted by 90° from the arm 263 as shown in FIG. 11.

Figure 14:
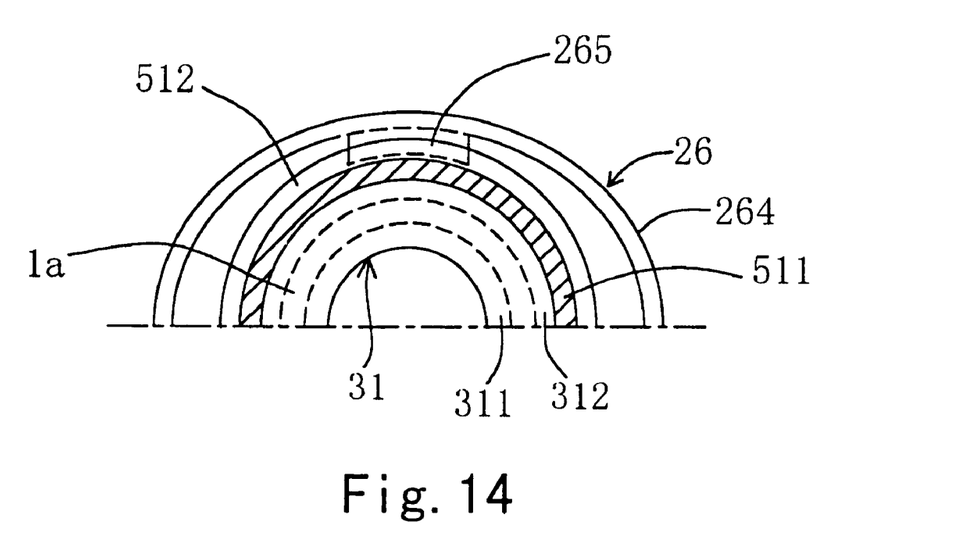
FIG. 14 is a substantially plan view where the ring is elliptical or oval in shape, showing a state in which the engagement member is being connected to the tubular mating member which is shown cross-sectionally, while the lower half of the view is omitted.
Figure 15:
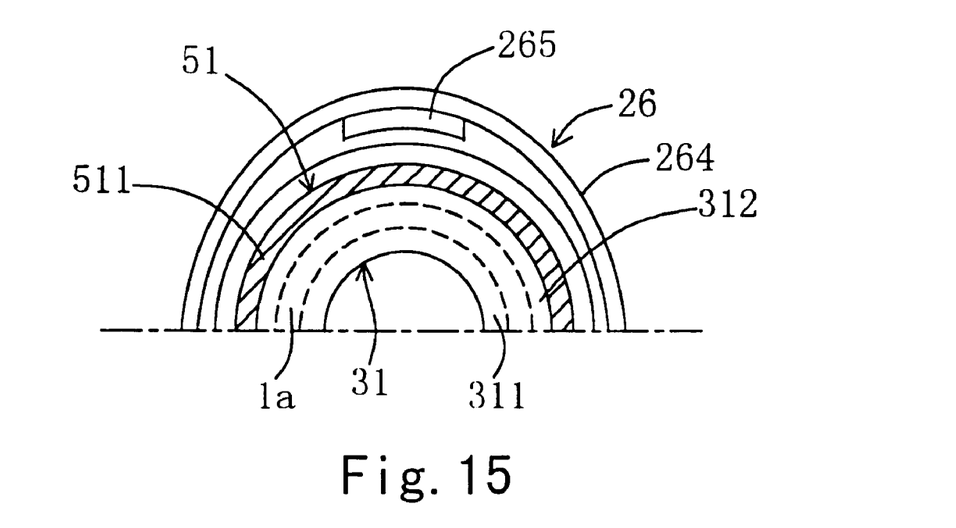
FIG. 15 is a schematically cross-sectional view where the ring is elliptical or oval in shape, showing a state in which the engagement member is released from the tubular mating member in the tube connecting structure of FIG. 14.

The above-stated ring 264 may be elliptical or oval, as depicted in FIGS. 14 and 15. In that case, it is necessary to provide a pair of ratcheted first engagement portions protruding from the inner peripheral surface of the ring at two opposing positions on the axial line thereof on which the ring has the smallest inner diameter. Further, in FIG. 11, a plurality of columnar supports 262 supporting the arms 263, respectively, are shown. It is possible to provide a disc-shaped or cylindrical support rising entirely on the outer peripheral surface of the cylindrical base 261 of the engagement member 26 and to provide a plurality of arms 263 axially extending from the disc-shaped or cylindrical support. In these engagement members having the above-described ring, the structures of other portions except for the ring may be the same as the cylindrical press-fitted member 31 and the tubular mating member 51 in FIG. 1, as shown in FIG. 11.

In the tube connecting structure using the engagement member 26 having the ring 264 shown in FIG. 11, the connection between the resin tube and the tubular mating member is the same as that in FIG. 1. That is, the insertion end portion 511 of the tubular mating member 51 is inserted between the arms 263 of the engagement member 26, and the cylindrical base 261, the cap-shaped outer cylindrical portion 312 of the cylindrical press-fitted member 31. The second engagement portion 512 of the tubular mating member 51 progresses along the inclined surfaces 265a of the ratcheted first engagement portions 265, and the circular, elliptical or oval ring 264 is deformed such that the diameters of portions of the ring 264 at which the pair of the first engagement portions 265 are provided, are widened radially outward. If the second engagement portion 512 is moved beyond the first engagement portions 265, the ring 26 returns to its original shapes by elastic force, thereby snap-engaging the second engagement portion 512 of the tubular mating member 51 with the first engagement portions 265 of the engagement member 26.

Figure 12:
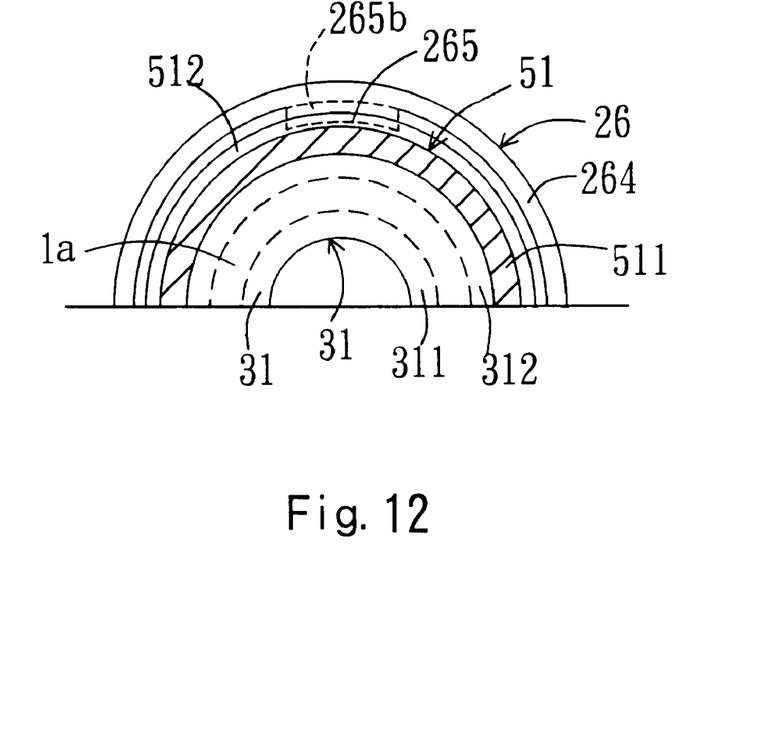
FIG. 12 is a substantially plan view seen from the right of FIG. 10, showing a state in which the engagement member is being connected to the tubular mating member which is shown cross-sectionally, while the lower half of the view is being omitted.
Figure 13:
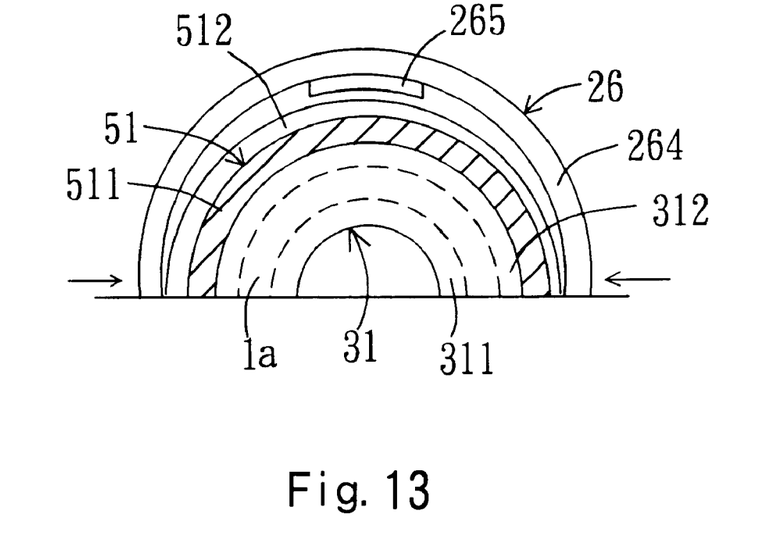
FIG. 13 is a schematically cross-sectional view showing a state in which the engagement member is released from the tubular mating member in the tube connecting structure of FIG. 11.

As described above, while the tubular mating member 51 is being connected to the engagement member 26 having the circular ring 264 as shown in, for example, FIG. 12, the annular second engagement portion 512 of the tubular mating member 51 abuts on and is stopped by the stopper surface 265b of the ratcheted first engagement portion 265 provided at the ring 264 of the engagement member 26. If the tubular mating member 51 is disengaged from the engagement member 26, the circular ring 264 of the engagement member 26 is pushed inward (indicated by an arrow in FIG. 13) from the direction almost perpendicular to the paired first engagement portions 265 to deform the ring 264 elliptically, as shown in, for example, FIG. 13, thereby expanding the distance between the opposing two first engagement portions 265. Thus, the first engagement portion 265 is disengaged from the second engagement portion 512, making it possible to separate the tubular mating member 51 from the engagement member 26 relative to each other without using a release tool.

If the engagement member having an elliptical or oval ring is used, the ring is pushed inward from the direction almost perpendicular to the paired first engagement portions (in the radial direction which the ring has the largest diameter) and the ring is then elastically deformed into generally circular shape. As a result, the distance between the paired first engagement portions provided to be opposite to each other in the radial direction which the elliptical or oval ring has the smallest inner diameter, is expanded. Thus, the first engagement portions are disengaged from the second engagement portion of the tubular mating member without using a release tool, thereby making it possible to release the tubular mating member from the engagement member.

It should be understood that the present invention can be not only worked by appropriately combining the various embodiments as stated above and but also worked in many other embodiments within the scope of the invention.

What is claimed is:

1. A tube connecting structure comprising:
   a resin tube having at least one end portion extending straight;
   a ring-shaped elastic seal member abutting an outer peripheral surface or an inner peripheral surface of said one end portion of the resin tube;
   an engagement member including a cylindrical base fitted onto the outer peripheral surface of said one end portion of the resin tube and a first engagement portion formed integrally with the cylindrical base;
   a cylindrical press-fitted member having a cylindrical body, said body press-fitted into the inner peripheral surface of the end portion of the resin tube, expanding a diameter of the end portion and fixing said engagement member to said resin tube; and
   a tubular mating member having an insertion end portion, said insertion end portion provided with a second engagement portion, said second engagement portion engaged with the first engagement portion of said engagement member, wherein
   said ring-shaped seal member is disposed in a radial annular groove defined by one end portion of said cylindrical press-fitted member and said engagement member such that said seal member contacts said tubular mating member and said one end portion of the resin tube when the insertion end portion of said tubular mating member is inserted into the outer peripheral surface or inner peripheral surface of the end portion of said resin tube, said second engagement portion engaged with said first engagement portion of said engagement member; thereby sealing the insertion end portion of said tubular mating member and said one end portion of said resin tube.

2. The tube connecting structure according to claim 1, wherein
   said tube connecting structure comprises a cap-shaped outer cylindrical portion returned outward of said cylindrical body to cover an end face of the resin tube and said outer peripheral surface of said one end portion of the resin tube at an one end of said cylindrical press-fitted member,
   said ring-shaped elastic seal member is axially retained on the outer peripheral surface of the resin tube between said cap-shaped outer cylindrical portion of said cylindrical body of said cylindrical press-fitted member and said cylindrical base of said engagement member, and
   when the insertion end portion of said tubular mating member is inserted into the outer peripheral surface side of the end portion of said resin tube, the inner peripheral surface of the insertion end portion is engaged with the outer peripheral surface of the cylindrical base and with the outer peripheral surface of said cap-shaped outer cylindrical portion.

3. The tube connecting structure according to claim 1, wherein
   said tube connecting structure comprises said cap-shaped inner cylindrical portion returned inner ward of said cylindrical body to cover an end face of said resin tube and said inner peripheral surface of said one end portion of the resin tube at an one end of the cylindrical base of said engagement member,
   said ring-shaped elastic seal member is axially retained on the inner peripheral surface of the resin tube between said cap-shaped inner cylindrical portion of the engagement member and said body of said cylindrical press-fitted member, and
   when the insertion end portion of said tubular mating member is inserted into the inner peripheral surface side of the end portion of said resin tube, said outer peripheral surface of said insertion end portion is engaged with both of said inner peripheral surface of said cylindrical body of said cylindrical press-fitted member and the inner peripheral surface of said cap-shaped inner cylindrical portion.

4. The tube connecting structure according to claim 3, wherein
   the tube connecting structure comprises a retaining member fitted into said inner peripheral surface of the end portion of said resin tube instead of said cap-shaped inner cylindrical portion, and
   said ring-shaped elastic seal member is axially retained on said inner peripheral surface of the resin tube between said retaining member and said cylindrical body of said cylindrical press-fitted member.

5. The tube connecting structure according to one of claims 1 through 4, wherein
said engagement member comprises a plurality of arm portions axially extending from the cylindrical base toward said end surface of said one end portion of the resin tube, and said arm portions defined a radial space between said arm portions and said outer peripheral surface of both of said outer peripheral surface of said cylindrical base and said cap-shaped outer cylindrical portion and said cylindrical base, said arm portions circumferentially spaced from one another; and ratcheted first engagement portions provided to protrude radially inwardly on tip end portions of said arm portions, respectively, and
said annular first engagement portions are snap-engaged with said second engagement portion of said tubular mating member inserted into a radial space of the plural arm portions.

6. The tube connecting structure according to one of claims 1 through 4, wherein
said engagement member comprises two arm portions axially extending from the cylindrical base toward axial one end direction, said two arm portions opposite to each other and circumferentially spaced from one another furthermore said two arm portions radially spaced from said cylindrical base each other; a circular ring portion integrally connected with a tip end portion of said two arm portions and provided coaxially with the cylindrical base; and a pair of ratcheted first engagement portions provided, opposite to each other, to protrude radially inwardly on an inner peripheral surface of the ring portion, and
the first engagement portions are snap-engaged with the second engagement portion of said tubular mating member inserted into interiors of said ring portion.

7. The tube connecting structure according to one of claims 1 through 4, wherein
said engagement member comprises two arm portions axially extending from the cylindrical base toward an axial one end direction, said two arm portions opposite to each other and circumferentially spaced from one another furthermore said two arm portions radially spaced from said cylindrical base each other; an elliptical or oval ring portion integrally connected with a tip end portion of said two arm portions and provided coaxially with the cylindrical base; and a pair of ratcheted first engagement portions provided, opposite to each other, to protrude radially inwardly on an axially inner peripheral surface of said ring portion on which the ring has a smallest inner diameter, and
the first engagement portions are snap-engaged with the second engagement portion of said tubular mating member inserted into interiors of said ring portion.

8. The tube connecting structure according to claim 1, wherein said tube connecting structure comprises a nipple portion smoothly protruding radially outwardly provided on the insertion end portion of said cylindrical press-fitted member.

9. The tube connecting structure according to claim 1, wherein said tube connecting structure includes an annular projection portion protruding from both edge portions of the cylindrical base of said engagement member radially inwardly or an irregular portion provided on the inner peripheral surface of the cylindrical base of said engagement member to bite into the outer peripheral surface of the resin tube.

10. A tube connecting structure for a resin tube and a tubular mating member comprising:

a resin tube having at least one end portion extending straight;
an engagement member including a cylindrical base fitted into an outer peripheral surface of the one end portion of said resin tube and first engagement means formed integrally with the cylindrical base and engaged with said tubular mating member;
a ring-shaped elastic seal member directly contacting with and attached onto the outer peripheral surface or inner peripheral surface on an axial intermediate portion of the one end portion of said resin tube;
a cylindrical press-fitted means having at least one cylindrical body, said body press-fitted into the inner peripheral surface of the one end portion of said resin tube and fixing said engagement member to an outer peripheral surface on the other side of the one end portion of said resin tube, said body including a retaining means for preventing disassembly of said elastic seal member from said resin tube, said retaining means including a radially extending circular surface opposed to said elastic seal member, said circular surface extending outwardly beyond the outer peripheral surface or extending inwardly beyond the inner peripheral surface of the one end portion of said resin tube; and
a tubular mating member having an insertion end portion, which can be relatively inserted into the outer peripheral surface of one end portion of the base of said engagement member by fluid tight-engaging an inner peripheral surface of said tubular mating member with the outer peripheral portion of said ring-shaped elastic seal member attached to the outer peripheral surface of the one end portion of said resin tube; or an insertion end portion, which can be relatively inserted into the inner peripheral surface of said press-fitted means by fluid tight-engaging an outer peripheral surface of said tubular mating member with the inner peripheral portion of said seal member attached to the inner peripheral surface of the one end of said resin tube;
and second engagement means provided on the outer peripheral surface of one of the insertion end portions of said mating member so as to be extended outward radially, said second engagement means being engaged with the first engagement means when one of the insertion end portions is relatively inserted into the one end portion of said resin tube, wherein
when the insertion end portion of said tubular mating member is inserted into the outer peripheral surface or the inner peripheral surface of the end portion of said resin tube, the second engagement means of said tubular mating member is engaged with the first engagement means of said resin tube, said seal member directly contacting with and interposed between said tubular mating member and said resin tube, thereby sealing the insertion end portion of said tubular mating member and the end portion of said resin tube.

11. The tube connecting structure according to claim 10, wherein
said ring-shaped elastic seal member directly contacts with and is attached to the inner peripheral surface on the axial intermediate portion of the one end portion of said resin tube,
the retaining means composing the ring-shaped surface of said cylindrical press-fitted means is composed of an inner cylindrical portion as one end portion of the body which is extended from the one end portion of the base of said engagement member and is turned so as to be cover the inner peripheral surface of said resin tube,
said ring-shaped elastic seal member is attached to and held on the inner peripheral surface of the end portion of said resin tube corresponding to a space between the other end portion of said cylindrical press-fitted means and the inner cylindrical portion, and said tubular mating member has the insertion end portion which can be relatively inserted into the inner peripheral surface of said press-fitted means by fluidtight-engaging the outer peripheral surf ace of said tubular mating member with the inner peripheral portion of said seal member attached to the inner peripheral surface of the one end of said resin tube.

12. The tube connecting structure according to claim 10, wherein said engagement member comprises a plurality of arm portions axially extending from the outer peripheral surface of the cylindrical base toward a tip end of said resin tube, and said arm portions circumferential spaced from one another furthermore said arm portions radially spaced from the outer peripheral surface of said cylindrical base; and ratcheted first engagement portions integrally provided to protrude radially inwardly on tip ends of said arm portions, respectively, and the first engagement portions are snap-engaged with the second engagement portion of said tubular mating member inserted into the plural arm portions.

13. The tube connecting structure according to claim 10, wherein said engagement member comprises a pair of arm portions axially extending from the cylindrical base toward a tip end of said resin tube, said arm portions opposite to each other and circumferential spaced from one another furthermore said arm portions radially spaced from the outer peripheral surface of the cylindrical base each other; a circular ring portion integrally connected with a tip end portion of the arm portions and provided coaxially with the cylindrical base; and a pair of ratcheted first engagement portions provided, opposite to each other, to protrude radially inwardly on an inner peripheral surface of the ring portion, and the first engagement portions are snap-engaged with the second engagement portion of said tubular mating member inserted into the ring portion because an inner diameter of the circular ring portion is larger than an outer diameter of the insertion end portion of said tubular mating member.

14. The tube connecting structure according to claim 10, wherein said engagement member comprises a pair of arm portions axially extending from the cylindrical base toward a tip end of said resin tube, said arm portions opposite to each other and circumferentially spaced from one another furthermore said arm portions radially spaced from a cap-shaped outer cylindrical portion and the outer peripheral surface of the cylindrical base each other; an elliptical or oval ring portion integrally connected with a tip end portion of the arm portions and provided coaxially with the cylindrical base; and a pair of ratcheted first engagement portions provided, opposite to each other, said first engagement portions protruded radially inwardly on an axially inner peripheral surface of said ring portion on which the ring has a smallest inner diameter; and the first engagement portions are snap-engaged with the second engagement portion of said tubular mating member inserted into the ring portion.

15. A tube connecting structure for a resin tube and a tubular mating member comprising:

a resin tube having at least one end portion extending straight;

an engagement member including a cylindrical base fitted into an outer peripheral surface of the one end portion of said resin tube and first engagement means formed integrally with the cylindrical base and engaged with said tubular mating member;

a cylindrical press-fitted means having a cylindrical body, said body press-fitted into an inner peripheral surface of the end portion of said resin tube, expanding a diameter of the end portion and fixing said engagement member to the outer peripheral surface of the other end side of the one end portion of said resin tube; a ring-shaped extended portion extending from an outer peripheral surface on one end of the body outward radially to exceed an outer peripheral surface on one end of the expanded diameter end portion;

a ring-shaped elastic seal member attached to and held on the outer periphery of the one end portion of said resin tube corresponding to a space between an one end portion of the base of said engagement member and the ring-shaped extended portion of said cylindrical press-fitted means; and a tubular mating member having an insertion end portion, an inner peripheral surf ace of the insertion end portion capable of being relatively inserted into the outer peripheral surface of the one end portion of the base of said engagement member by fluidtight-engaging said tubular mating member with an outer peripheral surface of said attached and held ring-shaped elastic seal member; protruded second engagement means provided on an outer peripheral surface of the insertion end portion, said second engagement means capable of being engaged with the first engagement means when the insertion end portion is relatively inserted into the one end portion of said resin tube, wherein when the insertion end portion of said tubular mating member is inserted into the outer peripheral surf ace on the end portion of said resin tube, the second engagement means of said tubular mating member is engaged with the first engagement means of said resin tube, said seal member directly contacting and interposed between said tubular mating member and said resin tube, thereby sealing the insertion end portion of said tubular mating member and the end portion of said resin tube.

16. The tube connecting structure according to claim 15, wherein said engagement member comprises a pair of arm portions axially extending from the cylindrical base toward a tip end of said resin tube, said arm portions opposite to each other and circumferentially spaced from one another furthermore said arm portions radially spaced from a cap-shaped outer cylindrical portion and the outer peripheral surface of the cylindrical base each other; an elliptical or oval ring portion integrally connected with a tip end portion of the arm portions and provided coaxially with the cylindrical base; and a pair of ratcheted first engagement portions provided, opposite to each other, said first engagement portions protruded radially inwardly on an axially inner peripheral surface of said ring portion on which the ring has a smallest inner diameter; and the first engagement portions are snap-engaged with the second engagement portion of said tubular mating member inserted into the ring portion.

* * * * *